United States Patent Office 3,700,670
Patented Oct. 24, 1972

3,700,670
PROCESS FOR MAKING Δ⁵ (10)-ESTRENES OR PREGNENES AND PRODUCTS OBTAINED THEREBY
Hans Detlef Berndt and Rudolf Wiechert, Berlin, Germany, assignors to Schering Aktiengesellschaft, Berlin and Bergkamen, Germany
No Drawing. Continuation-in-part of application Ser. No. 763,934, Sept. 30, 1968. This application Mar. 20, 1970, Ser. No. 26,187
Claims priority, application Germany, Mar. 20, 1969, P 19 14 898.2
Int. Cl. C07c 173/00, 169/20
U.S. Cl. 260—239.55 R        9 Claims

ABSTRACT OF THE DISCLOSURE

Method of preparing 3β-hydroxy-Δ⁵⁽¹⁰⁾-estrenes or 19-nor-pregnenes by catalytically reducing a corresponding 3-keto-Δ⁵⁽¹⁰⁾-steroid under a pressure of at least 10 atmospheres and at normal pressure when active Raney nickel is used as catalyst. The process permits obtaining a high yield of the 3β-hydroxy compositions which are important for the synthesis of 10β-methyl-androstanes and pregnanes.

CROSS REFERENCE TO RELATED APPLICATIONS

This application is a continuation-in-part application of Ser. No. 763,934, filed Sept. 30, 1968, now abandoned.

BACKGROUND OF THE INVENTION

It has already been proposed to produce certain 3β-hydroxy-Δ⁵⁽¹⁰⁾-steroids by reduction of the corresponding 3-keto-steroids. These compounds are important technically for introducing a 10β-methyl-group.

For instance, the reduction of 17β-propionyloxy-Δ⁵⁽¹⁰⁾-estrene-3-one with complex metal hydrides has been described by S. G. Levine et al. in the Journ. of Org. Chem., 31, 3995 (1966) and H. Smith et al. in the Journ. of Med. Chem., 10, 783 (1967). However, in the reduction methods so far practiced, a mixture is obtained which consists of 80 to 85% 3α- and only 15 to 20% 3β-hydroxy compounds. The subsequent epimerization of the 3α-hydroxy group does not accordingly lead to a satisfactory result, when the procedures of Levine and his collaborators, and Smith and his collaborators are followed.

3α-hydroxy-Δ⁵⁽¹⁰⁾-steroids are, however, not useful for the synthesis of androstanes and pregnanes since, upon introduction of a 10-methyl group by means of the Simmons-Smith Reaction and subsequent oxidation and isomerization, only products are obtained having a 10α-methyl structure which does not correspond to the structure of natural steroids.

It is therefore an object of the present invention, to provide for a method of making 3β-hydroxy-Δ⁵⁽¹⁰⁾-steroids, and in particular for making this type of compounds in a reduction process producing high yields.

SUMMARY OF THE INVENTION

In accordance with the invention, it has now been found that 3β-hydroxy-Δ⁵⁽¹⁰⁾-estrenes or 19-nor-pregnenes can be prepared by catalytically reducing a corresponding 3-keto-Δ⁵⁽¹⁰⁾-steroid under a pressure of at least 10 atmospheres and at normal pressure if active Raney nickel is used as catalyst.

The process permits obtaining high yields of the 3β-hydroxy-compositions which are important for the synthesis of 10β-methyl-androstenes and pregnenes.

The invention also includes specific novel 3β-hydroxy-Δ⁵⁽¹⁰⁾-estrenes and 3β-hydroxy-Δ⁵⁽¹⁰⁾-19-nor-pregnenes.

DESCRIPTION OF THE PREFERRED EMBODIMENTS

The preferred reducing agent for the invention of the present case is a catalytically activated hydrogen. The hydrogenation of the 3-keto group is effected in the presence of conventional catalysts, such as noble metals, for instance platinum or palladium, which may be supported on the customary carrier materials. Raney catalysts are preferred, particularly when they have been freshly made. The making of the Raney nickel catalyst follows well-known methods, for instance the methods described by H. R. Billica and H. Adkins in Organic Synthesis 29, 24 (1949).

The method of the invention is carried out by dissolving the starting product in an organic solvent and is then effected at a hydrogen pressure of preferably between 100 and 1,000 atmospheres. It is usually preferred to employ a hydrogen pressure between 200 and 400 atmospheres, which, however, does not exclude that the reaction may also be carried out at a pressure of 10 atmospheres. Normal pressures may be used if active, i.e., freshly prepared Raney metal is used as catalyst.

Usually the hydrogen pressure becomes lower during the course of the reaction, however, without impairing the results. However, it is also possible to employ a constant hydrogen pressure or a pressure that is increased during the proceeding reaction. In that case, the initial pressure must be maintained constant or must be increased by forcing further hydrogen under pressure into the reaction chamber.

As solvents there may be used all solvents that are inert to hydrogenation, such as alcohols, hydrocarbons, tetrahydrofuran, dioxane, acetic ester, etc. If it is desired to increase the activity of the catalyst in a specific case, this can be done in conventional manner by adding a basic substance, such as triethylamine.

The starting products are 3-keto-Δ⁵⁽¹⁰⁾-steroids. The steroids may have additional substituents in the molecule that do not interfere with the reaction, such as free or esterified or etherified hydroxyl groups in the 1-, 6-, 11-, 14-, 16-, 17-, 20-, and/or 21-position, and they may have additionally or alternatively alkyl groups, preferably lower alkyl groups, in the 1-, 2-, 4-, 6-, 7-, 15-, 16-, 17-, and/or 18-position, and they may further have additionally or alternatively an ethinyl group in the 17-position, a cyclomethylene residue in, for instance, the 1,2-, 6,7-, 15,16-, and/or 16,17-position, and they may also include free or protected keto groups. During the reaction of the present invention, it is only achieved that the 3-keto group will be converted into a 3β-OH group. The only further consideration is that an additional unprotected keto group in the molecule may possibly also be reduced to a hydroxyl group and an additional 17-ethinyl group is reduced to the 17-ethyl group.

The products obtained according to the present invention are technically valuable intermediates or starting materials for the introduction of a 19-methyl group, for instance by means of the well-known Simmons-Smith reaction. It is not possible to utilize the corresponding 3α-hydroxy-Δ⁵⁽¹⁰⁾- or 3-keto-Δ⁵⁽¹⁰⁾-steroids as the starting steroids for the introduction of the 19-methyl group, since when carrying out the Simmons-Smith reaction with the last-mentioned starting materials only compounds with an undesirable 10α-methyl structure are obtained. The products of the invention are intermediates for producing such effective steroids which contain a methyl group at C₁₀. For this purpose only such starting materials may be used which, in addition to the Δ⁵⁽¹⁰⁾-double bond possess the 3-position hydroxyl group in β-position. The introduction of the methyl group in 10-position is then carried out according to the Simmons-Smith-Reaction, i.e. the Δ⁵⁽¹⁰⁾- double bond is reacted with methylene iodide in the presence of zinc-copper in a suitable solvent. Thereafter, the 3β-OH-group is oxidized and the 5(10)-methylene ring which was formed by the Simmons-Smith Reaction is split, for instance with HCl in glacial acetic acid, so that finally the desired 3-keto-Δ⁴-grouping is formed.

This above-mentioned procedure is at the present the most advantageous technical method for introducing sterospecifically a $C_{10}$ methyl group in the β-position in the 19-nor steroids.

The following examples will further illustrate the invention, but are not to be construed as limiting the same in any way.

Example 1

1 g. racemic 17β-hydroxy-18-methyl-5(10)-estrene-3-one was dissolved in 60 ml. ethanol and was hydrogenated in the presence of about 0.3 g. freshly prepared Raney nickel in a 100 ml. autoclave at a hydrogen pressure of 150 atmospheres and upon shaking for 30 minutes at room temperature. The product was then filtered off from the catalyst and was evaporated to dryness and the residue was crystallized from diisopropylether/acetone. There was obtained 0.48 g. racemic 18-methyl-5(10)-estrene-3β,17β-diol; melting point 187–190° C.

Example 2

1 g. racemic 17β-acetoxy-18-methyl-5(10)-estrene-3-one was poured into an autoclave together with 50 ml. tetrahydrofuran and about 0.3 g. Raney nickel. The mixture was hydrogenated for 15 minutes at 300 atmospheres hydrogen pressure and 50° C. After removing the catalyst by filtration and evaporation of the solvent, the residue was subjected to chromatography (gradient chromatography) through 50 g. aluminum oxide (Woelm, neutral I) with hexane/20% acetic ester. After recrystallization with hexane/acetone, there was obtained 0.68 g. racemic 17β-acetoxy-18-methyl-5(10)-estrene-3β-ol, having a melting point 117–120° C.

Example 3

1 g. 17β-hydroxy-18-methyl-5(10)-estrene-3-one was dissolved in 60 ml. tetrahydrofuran and was reacted then with 0.3 g. Raney nickel followed by shaking in an autoclave for 10 minutes at room temperature and at a hydrogen pressure of 400 atmospheres. The catalyst was removed by filtration and the solvent by evaporation. The residue was recrystallized from diisopropylether. There was obtained 0.73 g. 18-methyl-5(10)-estrene-3β,17β-diol having a melting point 157–158° C.

Example 4

1 g. 17β-acetoxy-18-methyl-5(10)-estrene-3-one was hydrogenated under the conditions given in Example 3. The reaction product was subjected to chromatography (gradient chromatography) through 50 g. aluminum oxide (Woelm, neutral I) with hexane/20% acetic ester. The product obtained was an oil which was dissolved in a small amount of methanol. The product was then precipitated in ice water and removed by suction. There was obtained 0.83 g. 17β-acetoxy-18-methyl-5(10)-estrene-3β-ol, with a melting point 103–104° C.

Example 5

0.5 g. 17β-hydroxy-5(10-estrene-3-one was dissolved in 30 ml. ethanol and placed in a 50 ml. autoclave together with 0.15 g. Raney nickel. The product was subjected to hydrogenation for 15 minutes at room temperature while being shaken and using a hydrogen pressure of 800 atmospheres. The catalyst was then removed and the solvent evaporated. The residue was separated by means of thin layer chromatography through silica gel upon development with hexane/acetic ester (at a ratio of 7:3) and the desired product was subjected to elution with chloroform/methanol (ratio 1:1) to remove the adsorption agent. There was obtained 0.43 g. 5(10)-estrene-3β,17β-diol with a melting point 125–128° C. (from cyclohexane).

Example 6

A solution was prepared from 0.6 g. 17β-hydroxy-17α-methyl-5(10)-estrene-3-one and 30 ml. ethanol which was subjected to shaking in an autoclave at room temperature in the presence of about 0.15 Raney nickel at 400 atmospheres of hydrogen pressure. The catalyst was removed and the solvent evaporated. The product was then recrystalized from isopropylether. There was obtained 0.46 g. 17α - methyl - 5(10) - estrene - 3β,17β - diol, melting point 161.5–163° C.

Example 7

2 g. 17β - tetrahydropyranyloxy - 18 - methyl - 5(10)-estrene-3-one (melting point 144–147° C.) were dissolved in 50 ml. tetrahydrofuran. The solution was placed in a 100 ml. autoclave together with 1 ml. triethylamine and about 0.3 g. freshly prepared Raney nickel W-6 (Am. Soc. 70, 695, 1948). The mixture was then hydrogenated for 30 minutes at room temperature with a hydrogen pressure of 200 atmospheres. The catalyst was removed by filtration and the solvent was evaporated in a vacuum. The residue was taken up with methylenechloride and the organic phase was washed successively with 1 N HCl, water, aqueous sodium bicarbonate solution and water. It was then dried over sodium sulfate and concentrated to dryness in a vacuum. The residue was recrystallized from hexane/acetone. There was obtained 1.83 g. 17β-tetrahydropyranyloxy - 18-methyl-5(10)-estrene-3β-ol, melting point 124–125° C.

Example 8

5 g. 17β-propionyloxy - 18 - methyl - 5(10) - estrene-3-one (melting point 81–82° C.) were dissolved in 60 ml. tetrahydrofuran and then reacted with 1 ml. triethylamine and about 1 g. freshly prepared Raney nickel and were subjected to shaking for 30 minutes at room temperature in an autoclave at a hydrogen pressure of 150 atmospheres. The catalyst was removed by filtration and the solvent was evaporated in a vacuum. The residue was dissolved in diethylether and the solution was washed successively with 1 N HCl, water, aqueous sodium sulfate and concentrated to dryness in a vacuum. The residue was subjected to chromatography through 250 g. silica gel using methylenechloride. There was obtained 3.68 g. 17β - propionyloxy - 18 - methyl-5(10)-estrene-3β-ol in the form of an oil.

Thin layer chromatography: Rf value=0.5 (DC-ready-made plates of silica gel $F_{254}$ Merck): using a mixture of methylenechloride and methanol in a ratio 95:5. To compare, the Rf value of 17β-propionyloxy-18-methyl-5(10)-estrene-3α-ol is 0.43.

Example 9

5 g. 17β - hexanoyloxy - 18 - methyl - 5(10) - estrene-3-one were subjected to hydrogenation in the manner described in Example 8. After a corresponding treatment and chromatography, there was obtained 3.2 g. 17β-hexanoyloxy - 18 - methyl - 5(10) - estrene - 3β - ol in the form of an oil; Rf-value=0.52.

To compare, the Rf value of a 3α-hydroxy compound is 0.45.

Example 10

1 g. 20α-hydroxy - 19 - nor - 5(10) - pregnene-3-one was dissolved in 50 ml. tetrahydrofuran and then subjected to hydrogenation in the presence of 0.3 g. freshly prepared Raney nickel. The reaction was carried out in a 100 ml. autoclave by shaking for 30 minutes at room temperature using a hydrogen pressure of 200 atmospheres. The catalyst was removed and the solution concentrated to dryness and thereafter recrystallized from hexane/acetone. There was obtained 0.53 g. 19 - nor-5(10)-pregnene-3β,20β-diol, melting point 158–160° C.

Example 11

1 g. 17β - acetoxy - 18 - methyl - 5(10) - estrene-3-one was subjected to hydrogenation in the presence of 3 g. freshly prepared Raney nickel at a hydrogen pressure of 100 atmospheres in the manner described in Example 3. The reaction mixture was subsequently subjected to the corresponding treatment described there. The crude product, after isolation, was subjected to chromatography with methylenechloride through 50 g. silica gel. The residue of the methylenechloride solution was finally recrystallized from hexane. There was obtained 0.7 g. 17β-acetoxy - 18 - methyl - 5(10) - estrene - 3β - ol, melting point 103–104° C.

Example 12

1 g. 17β - acetoxy - 18 - methyl - 5(10) - estrene-3-one was dissolved in 60 ml. tetrahydrofuran and was then subjected to shaking in an autoclave at room temperature and at a hydrogen pressure of 20 atmospheres in the presence of about 0.3 g. freshly prepared Raney nickel. The catalyst was then removed by filtration and the solvent was evaporated. The residue was subjected to chromatography with methylenechloride through 50 g. silica gel. The crude product isolated after evaporation of the methylenechloride was then recrystallized from hexane. There was thus obtained 0.5 g. 18-methyl-5(10)-estrene-3β-17β-diol, melting point 101–103° C.

Example 13

490 mg. 17β - hydroxy - 17α - ethinyl - 5(10) - estrene-3-one was dissolved in 50 ml. tetrahydrofuran and was placed in a 100 ml. autoclave together with about 300 mg. freshly prepared Raney nickel. The mixture was subjected to hydrogenation at room temperature for one hour and at a hydrogen pressure of 50 atmospheres. The catalyst was then removed by filtration and the solvent evaporated. The residue was subjected to chromatography through 100 g. silica gel. After gradient elution with hexane/20% acetic ester and crystallization from diisopropylether, there was obtained 212 mg. 17α-ethyl-5(10)-estrene-3β,17β-diol; melting point 128–131° C.

Example 14

550 mg. 19 - nor - 5(10) - pregnene - 3,20 - dione was dissolved in 50 ml. tetrahydrofuran. The solution was subjected to hydrogenation for 30 minutes at room temperature at a hydrogen pressure of 100 atmospheres in the presence of freshly prepared Raney nickel. The catalyst was removed by filtration and the solvent was evaporated in a vacuum. The reaction product was recrystallized from diisopropylether and there was thus obtained 404 mg. 3β - hydroxy - 19 - nor - 5(10) - pregnene - 20 - one, melting point 111–112° C.

Example 15

1 g. 17α - hydroxy - 20,20 - ethylenedioxy - 19 - nor-5(10) - pregnene - 3 - one was dissolved in 50 ml. tetrahydrofuran and shaken in an autoclave for one hour at room temperature using a hydrogen pressure of 100 atmospheres in the presence of freshly prepared Raney nickel. The catalyst was removed by filtration and the residue was concentrated to dryness and then subjected to chromatography through 100 g. silica gel. After gradient elution with hexane/20% acetic ester and recrystallization from diisopropylether, there was obtained 671 mg. 20,20 - ethylenedioxy - 19 - nor - 5(10) - pregnene - 3β-17α-diol, melting point 164–165° C.

Example 16

A solution of 1 g. 17β - acetoxy - 5(10) - estrene-3-one in 50 ml. tetrahydrofuran was subjected to hydrogenation in the presence of freshly prepared Raney nickel. The reaction was carried out for one hour at room temperature in an autoclave using 100 atmospheres of hydrogen pressure. The catalyst was removed by filtration and the solvent evaporated in a vacuum. The residue was subjected to chromatography through 100 g. aluminum oxide (Woelm, neutral I). After gradient elution with hexane/20% acetic ester and recrystallization through hexane/ether there was obtained 680 mg. 17β - acetoxy-5(10)-estrene-3β-ol, melting point 110–112° C.

Example 17

In the manner described in Example 16, 1 g. 17β-propionyloxy-5(10)-estrene-3-one was subjected to hydrogenation. After corresponding further treatment, there was isolated 665 mg. 17β-propionyloxy-5(10)-estrene-3β-ol, melting point 113–115° C.

Example 18

1 g. 17β-tetrahydropyranyloxy-5(10)-estrene-3-one was dissolved in 50 ml. tetrahydrofuran and was subjected to hydrogenation in an autoclave for 30 minutes at room temperature in the presence of freshly prepared Raney nickel. The hydrogen pressure was 50 atmospheres. The catalyst was then removed by filtration and the solvent evaporated in vacuum. The residue was subjected to chromatography through 100 g. aluminum oxide (Woelm, neutral I). After gradient elution with hexane/20% acetic ester and recrystallization from diisopropylether, there was obtained 710 mg. 17β-tetrahydropyranyloxy-5(10)-estrene-3β-ol, melting point 133.5–135° C.

Example 19

490 mg. 5(10)-estrene-3,17-dione (melting point 146–147° C.) were dissolved in 50 ml. tetrahydrofuran and the solution was then subjected to hydrogenation in an autoclave for 2 hours at room temperature in the presence of freshly prepared Raney nickel and at a pressure of 300 atmospheres hydrogen. The catalyst was removed by filtration and the solvent evaporated in a vacuum. The residue was subjected to chromatography through 100 g. aluminum oxide (Woelm, neutral I). After gradient elution with hexane/30% acetic ester there was obtained 240 mg. 5(10)-estrene-3β,17β-diol (melting point 124–126° C.) along with the 17-keto compound.

Example 20

1 g. 17β-hydroxy-5(10)-estrene-3-one was dissolved in 50 ml. tetrahydrofuran and then subjected to hydrogenation in the presence of freshly prepared Raney nickel at room temperature and under normal pressure. After 30 minutes, the catalyst was removed by filtration and the filtrate evaporated to dryness. The evaporation residue was crystallized out of hexane/acetone. There was recovered 0.59 g. 5(10)-estrene-3β-17β-diol having a melting point of 144–146° C.; $[\alpha]_D^{25°} = 108°$ (c.=0.5 $CHCl_3$).

Example 21

10 g. 17β-acetoxy-5(10)-estrene-3-one in 60 ml. tetrahydrofuran were hydrogenated in the presence of freshly prepared Raney nickel for 1 hour under normal pressure. The catalyst was filtered off and the solvent evaporated in a vacuum. The residue was chromatographed through 1 kg. aluminum oxide (Woelm, neutral I). After gradient elution with hexane/30% acetic ester and crystallization out of hexane/acetone, there were obtained 5.2 g. 17β-acetoxy-5(10)-estrene-3β-ol; melting point 115–116° C.; $[\alpha]_D^{25°} = +85°$ (c.=0.5; chloroform).

Example 22

Analogously to Example 21, 0.5 g. 17β-propionyloxy-5(10)-estrene-3-one in 10 ml. acetic ester were hydrogenated and the reaction product chromatographed on 50 g. aluminum oxide. There was recovered 0.5 g. 17β-propionyloxy-5(10)-estrene-3β-ol which following crystallization from hexane melted at 113–114° C.;

$$[\alpha]_D^{25°} = +83°$$

(c.=0.25; chloroform).

Example 23

The procedure of Example 21 was followed to hydrogenate 10 g. 17β-tetrahydropyranyloxy-5(10)-estrene-3-one. After working up and chromatographing the resultant product on 1 kg. aluminum oxide Woelm, neutral I) (gradient elution with hexane/20 acetic ester), there were recovered 7.6 g. 17β-tetrahydropyranyloxy-5(10)-estrene-3β-ol which following crystallization out of hexane melted at 135–137° C.; $[\alpha]_D^{25°} = +100°$ (c.=0.5; chloroform).

Example 24

1 g. 17β-hydroxy-18-methyl-5(10)-estrene-3-one were dissolved in 20 ml. methanol and then hydrogenated in the presence of freshly prepared Raney nickel at room temperature for 30 minutes. The catalyst was then filtered off, the solvent evaporated and the residue crystallized out of acetic ester. There was recovered 0.53 g. 18-methyl-5(10)-estrene-3β,17β-diol having a melting point of 162–163° C.; $[\alpha]_D^{25°} = +88°$ (c.=0.5; chloroform).

Example 25

10 g. 17β-acetoxy-18-methyl-5(10)-estrene-3-one were dissolved in 60 ml. tetrahydrofuran and after the addition of freshly prepared Raney nickel and 1 ml. triethylamine, hydrogenated at room temperature for 1 hour. The catalyst was filtered off and the solvent evaporated off under vacuum. The residue was dissolved in diethyl ether, the organic phase washed successively with 1 N HCl, water, aqueous sodium hydrogen carbonate and water, dried with sodium sulfate and the dried solution evaporated to dryness. The residue was chromatographed on 1 kg. silica gel with methylene chloride. 4.93 g. 17β-acetoxy-18-methyl-5(10)-estrene-3β-ol melting at 103–104° C.; $[\alpha]_D^{25°} = 77°$; (c.=0.5 chloroform) were recovered.

Example 26

10 g. 17β - tetrahydropyranyloxy-18-methyl-5(10)-estrene-3-one were dissolved in 60 ml. tetrahydrofuran and then hydrogenated at room temperature and under normal pressure in the presence of freshly prepared Raney nickel for 1 hour. The catalyst was removed by filtering, the solvent evaporated off and the reaction product chromatographed on 1 kg. aluminum oxide (Woelm, neutral I). Following gradient elution with hexane/20% acetic ester, there were recovered 7.9 g. 17β-tetrahydropyranyl-oxy-18-methyl-5(10)-estrene - 3β - ol having a melting point of 113–114° C.; $[\alpha]_D^{25°} = +45°$ (c.=0.5; chloroform).

Example 27

0.5 g. 17α-hydroxy-20-ethylene-dioxy-19-nor-5(10)-pregnene-3-one was dissolved in 10 ml. acetic ester and after the addition of Raney nickel hydrogenated for 30 minutes at room temperature. Following removal of the catalyst by filtering, the solvent was evaporated off and the crude product thereby obtained separated on 100 g. silica gel. After gradient elution with hexane/20% acetic ester, 0.27 g. 17α-hydroxy-20-ethylene-dioxy-19-nor-5(10)-pregnene-3β-ol having a melting point of 164–165° C; $[\alpha]_D^{25°} = +72°$ (c.=0.5; chloroform) was recovered.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. Process of preparing a 3β-hydroxy-Δ$^{5(10)}$-estrene or 3β-hydroxy-Δ$^{5(10)}$-19-nor-pregnene, comprising catalytically reducing a Δ$^{5(10)}$-pregnene-3-one or a Δ$^{5(10)}$-estrene-3-one by reaction with hydrogen at atmospheric or elevated pressure in the presence of Raney nickel.

2. Process according to claim 1 which comprises conducting said reduction at a pressure of at least 10 atmospheres.

3. Process according to claim 1, wherein said 3β-hydroxy-Δ$^{5(10)}$-estrenes or 3β-hydroxy-Δ$^{5(10)}$-19-norpregnenes are substituted in at least one of the 1-, 6-, 11-, 14-, 16-, 17-, 20- and 21-positions with a free esterified or etherified hydroxylgroup, and in at least one of the 1-, 2-, 4-, 6-, 7-, 15-, 16-, 17- and 18-positions with an alkyl and optionally may be further substituted in 1.2-, 6.7-, 15.16-, and/or 16.17-position with a cyclomethylene residue, and in 11-, 17- and/or 20-position with a free or protected keto group, and said reduction is of the corresponding 3-keto-Δ$^{5(10)}$-steroid.

4. Process according to claim 3, wherein said hydroxyl group is a free hydroxyl group.

5. Process according to claim 3, wherein the said hydroxyl group is esterified and in which the ester residue is derived from an aliphatic carbonic acid containing 1 to 11 carbon atoms.

6. Process according to claim 3, wherein the said hydroxyl group is etherified and in which the ether residue is the tetrahydropyranyl residue.

7. Process according to claim 3, wherein said alkyl group is a lower alkyl group having between 1 and 5 carbon atoms.

8. Process according to claim 2, wherein a hydrogen pressure of between 100 and 1,000 atmospheres is employed.

9. Process according to claim 2, wherein a hydrogen pressure of between 200 and 400 atmospheres is employed.

References Cited

UNITED STATES PATENTS

| | | | |
|---|---|---|---|
| 3,318,922 | 5/1967 | Windholz et al. | 260—397.4 |
| 3,346,601 | 10/1967 | Wettstein et al. | 260—397.4 |

OTHER REFERENCES

Djerassi et al.: vol. 74, JACS, pp. 1712 and 1713 (1952).

Djerassi et al.: vol. 75, JACS, pp. 3506 and 3508 (1953).

Kirk et al.: Steroid Reaction Mechanisms, p. 143, Elsevier Pub. Co. N.Y. (1968).

HENRY A. FRENCH, Primary Examiner

U.S. Cl. X.R.

260—239.55 C, 397.5